United States Patent
Haskara et al.

(10) Patent No.: US 7,231,906 B1
(45) Date of Patent: Jun. 19, 2007

(54) SIMULTANEOUS EGR CORRECTION AND INDIVIDUAL CYLINDER COMBUSTION PHASE BALANCING

(75) Inventors: Ibrahim Haskara, Macomb, MI (US); Anupam Gangopadhyay, Troy, MI (US); Paul Anthony Battiston, Clinton Township, MI (US); Frederic Anton Matekunas, Troy, MI (US); Patrick G. Szymkowicz, Shelby Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/475,758

(22) Filed: Jun. 27, 2006

(51) Int. Cl.
*F02M 7/00* (2006.01)
*F02M 25/07* (2006.01)

(52) U.S. Cl. .................. 123/435; 123/568.11

(58) Field of Classification Search ........... 123/434, 123/435, 672, 673, 568.11, 568.21
See application file for complete search history.

(56) References Cited

U.S. PATENT DOCUMENTS

| | | | |
|---|---|---|---|
| 2003/0024246 A1* | 2/2003 | Beck et al. | 60/599 |
| 2003/0200955 A1* | 10/2003 | zur Loye et al. | 123/435 |
| 2004/0103860 A1* | 6/2004 | zur Loye et al. | 123/27 R |
| 2004/0118116 A1* | 6/2004 | Beck et al. | 60/601 |
| 2005/0211229 A1* | 9/2005 | Pellizzari et al. | 123/525 |
| 2006/0123770 A1* | 6/2006 | Pozar et al. | 60/285 |

* cited by examiner

*Primary Examiner*—John T. Kwon
(74) *Attorney, Agent, or Firm*—Kathryn A. Marra

(57) ABSTRACT

An internal combustion engine is configured with combustion chamber pressure sensing and exhaust gas recirculation apparatus. Fuel injection timing is adjusted based on combustion phasing and exhaust gas recirculation is controlled based on average fuel injection timing adjustments.

19 Claims, 3 Drawing Sheets

SIMULTANEOUS EGR CORRECTION AND INDIVIDUAL CYLINDER COMBUSTION PHASE BALANCING

TECHNICAL FIELD

This invention relates to internal combustion engines. More particularly, the invention is concerned with exhaust gas recirculation (EGR) control and individual cylinder phasing.

BACKGROUND OF THE INVENTION

Modern diesel and gasoline internal combustion (IC) engines use significant amounts of EGR to reduce the emission of nitric oxides (commonly known as NOx). In some diesel applications the level of EGR achieved is even more important as inability to achieve the required level of EGR may cause stability problems particularly in non-conventional or special combustion modes, e.g. pre-mixed charge compression ignition (PCCI). And, certain other combustion modes, e.g. controlled auto-ignition, may have greater sensitivity to EGR concentrations also.

Particular levels of EGR may be achieved by using a closed-loop control system for the EGR valve position where the set-points of the closed-loop system are calibrated in terms of fresh airflow as seen by a mass airflow (MAF) sensor. Such set-points work as long as there is no error in the MAF sensor and also if there are no other differences in how the engine subsystems operate in comparison to the calibration. For example, any change in boost pressure, exhaust back-pressure, intake manifold temperature or other factors (e.g. ambient air temp and humidity) that affect volumetric efficiency of the engine will have an adverse effect on the EGR control system and thus the actual EGR achieved will be quite different from the calibrated value, thus causing undesirable levels of NOx emissions or instability of the combustion process.

Therefore, what is needed is a more precise EGR control.

SUMMARY OF THE INVENTION

A multi-cylinder internal combustion engine is configured with cylinder pressure sensing, exhaust gas recirculation, and fuel delivery apparatus. A method for simultaneous exhaust gas recirculation and individual cylinder combustion phasing control includes providing combustion phasing information from the cylinder pressure sensing apparatus and closed-loop adjusting the fuel delivery apparatus in accordance with setpoints and feedback in the combustion phasing information. Further, the exhaust gas recirculation apparatus is closed-loop controlled in accordance with setpoints and feedback in a preselected exhaust gas recirculation control parameter. The setpoints in the preselected exhaust gas recirculation control parameter are adjusted based on a comparison of the adjustments to the fuel delivery apparatus.

A control apparatus for an internal combustion engine having a plurality of combustion chambers and fuel delivery apparatus includes a combustion chamber pressure sensing apparatus for providing combustion chamber phasing information, an exhaust gas recirculation apparatus, and a control module adapted for adjusting the fuel delivery apparatus to effect a first target in the combustion phasing information, and for controlling the exhaust gas recirculation apparatus to effect a second target in a preselected engine parameter, and adjusting the second target based on a comparison of an average adjustment across all cylinders to the fuel delivery apparatus to a predetermined mean adjustment.

A controller for an internal combustion engine having a plurality of combustion chambers includes an EGR control responsive to a first control setpoint effective to control an EGR apparatus setting, a fuel delivery control operative to monitor combustion chamber phasing and adjust a fuel delivery apparatus to effect a combustion phasing setpoint, and an EGR trim control operative to monitor an average adjustment across all combustion chambers to the fuel delivery apparatus and adjust the first control setpoint to effect a second control setpoint for the average adjustment.

In accordance with various embodiments, combustion information may include combustion phasing information and combustion duration information. Also in accordance with various embodiments, preselected exhaust gas recirculation control parameter may include, for example, mass airflow, EGR rate, or intake oxygen fraction. And, exhaust gas recirculation apparatus may include, for example, an EGR valve and variable valvetrains.

DESCRIPTION OF THE PREFERRED EMBODIMENT

Figure 1:
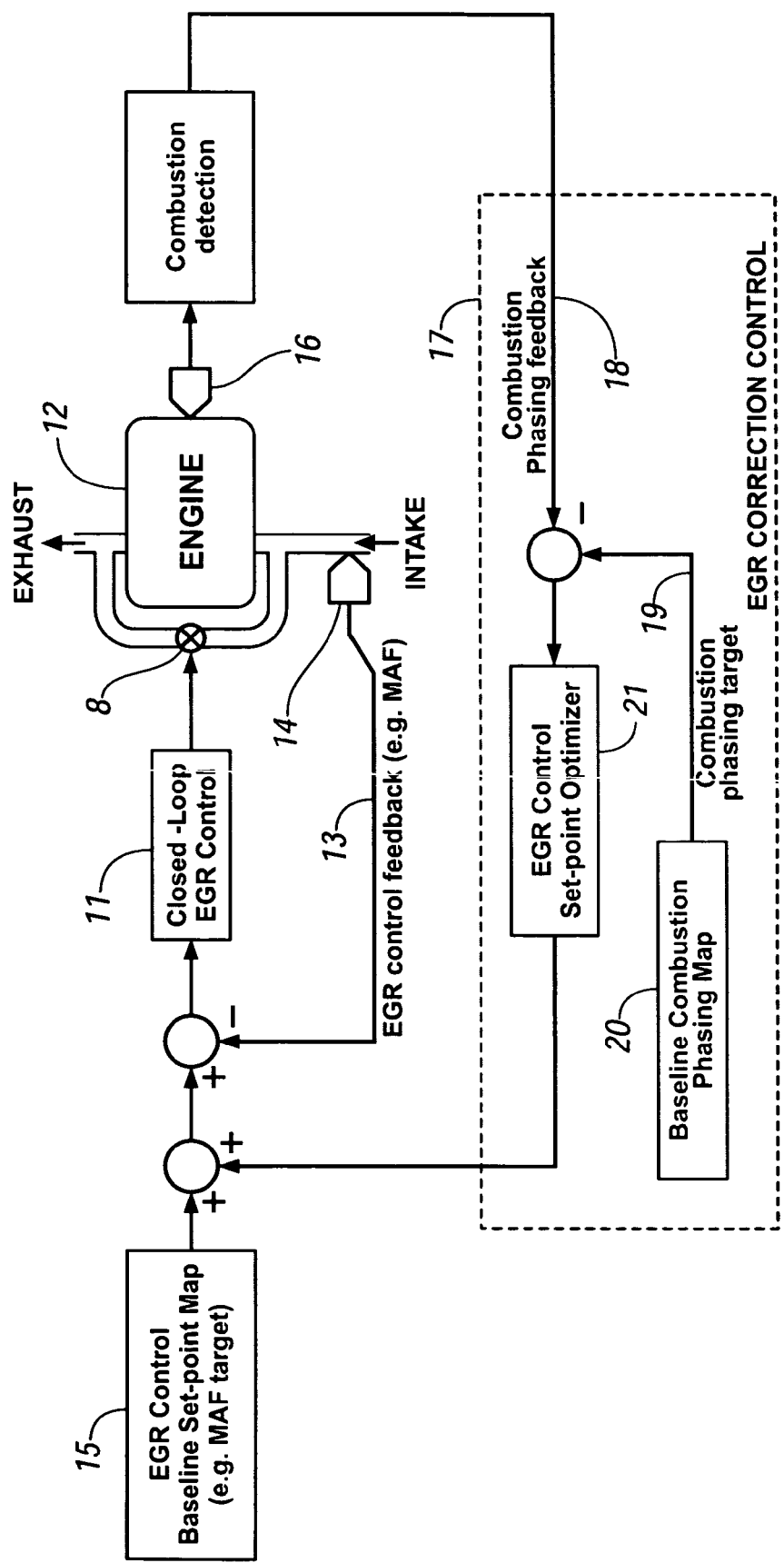
FIG. 1 is a block diagram of one embodiment of a cylinder pressure based EGR control.
Figure 2:
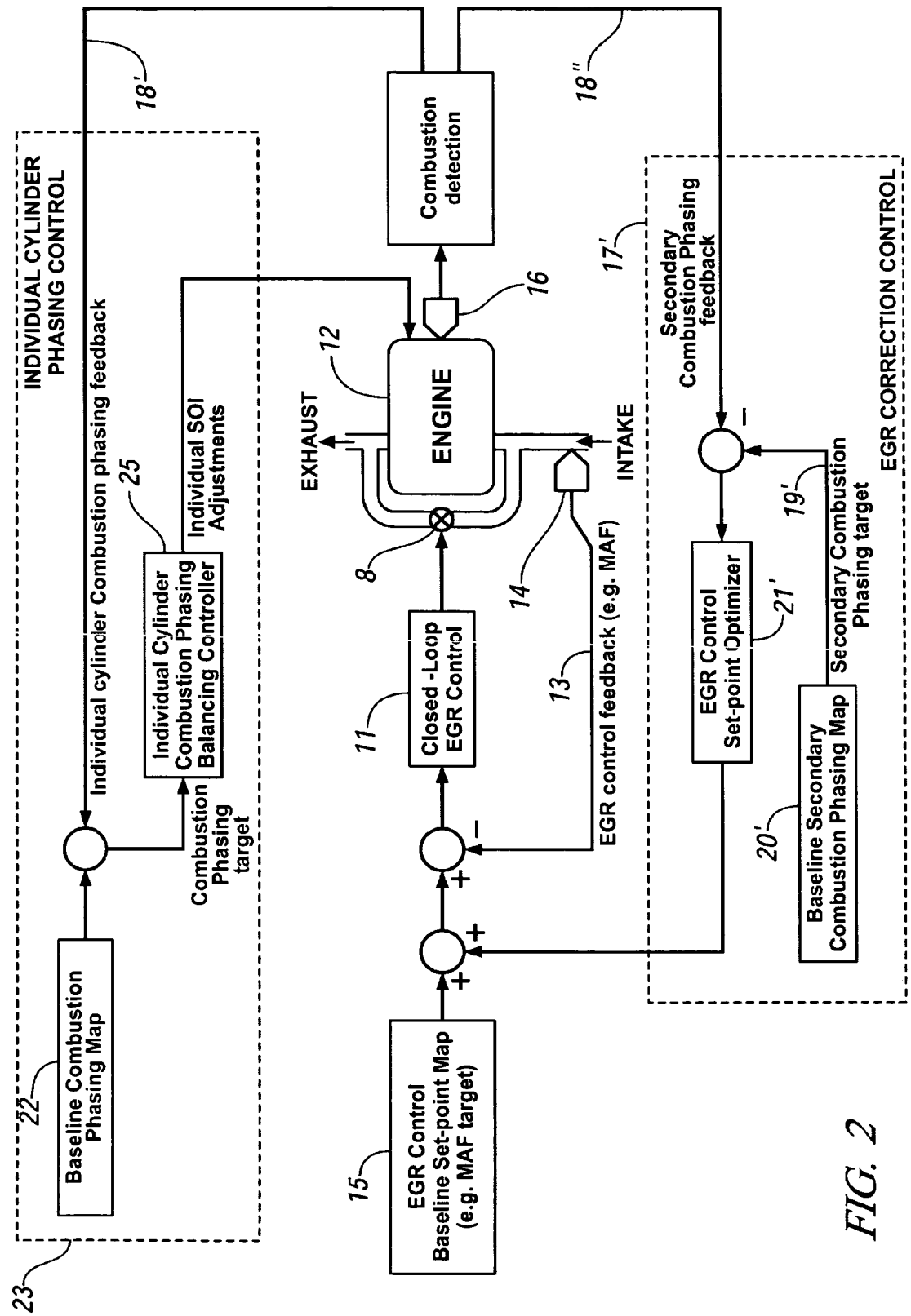
FIG. 2 is a block diagram of one embodiment of a cylinder pressure based EGR control and cylinder phasing control.
Figure 3:
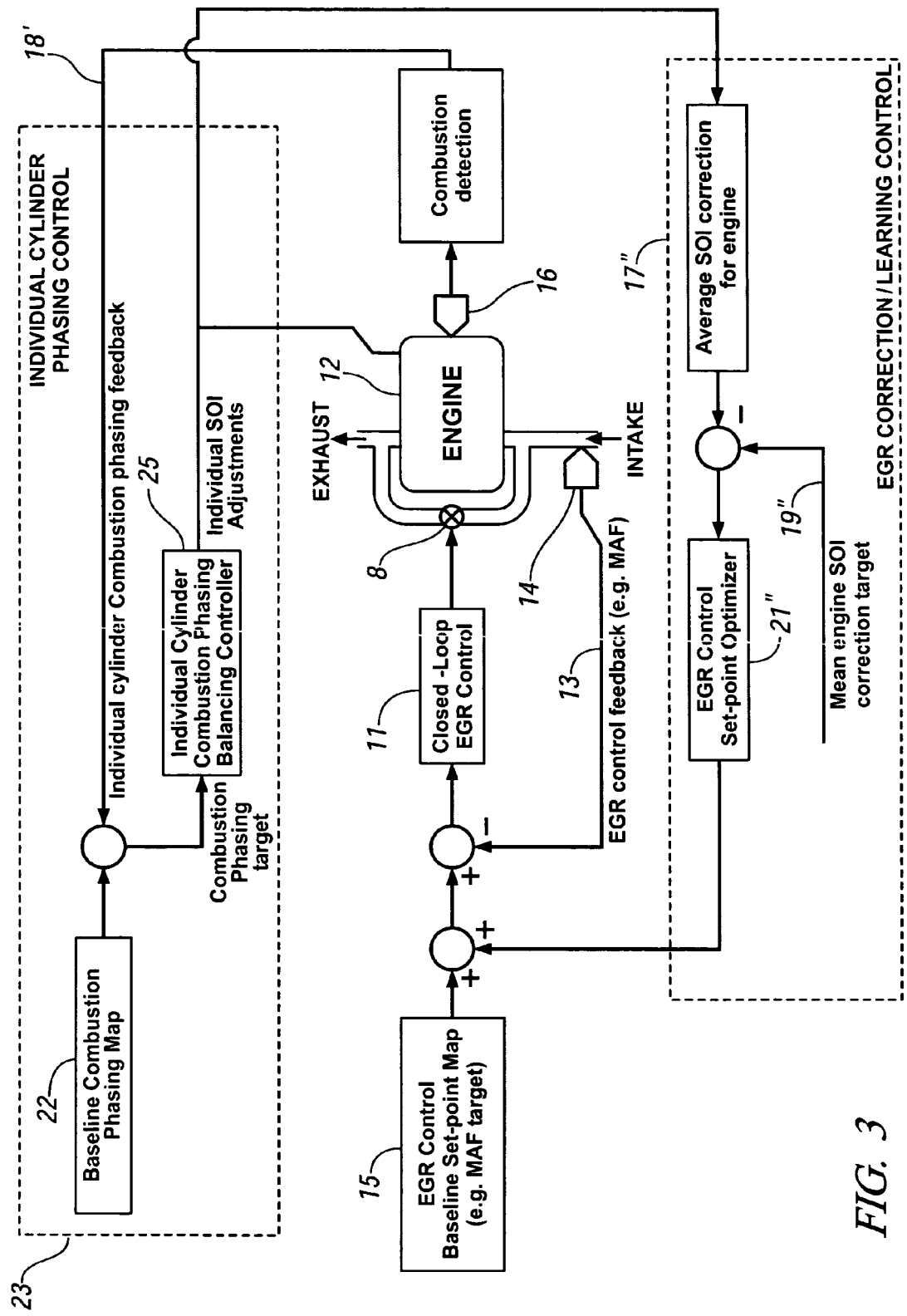
FIG. 3 is a block diagram of an alternative embodiment of a cylinder pressure based EGR control and cylinder phasing control.

Referring now to FIGS. 1–3, a schematic diagram depicts an internal combustion engine and control system which has been constructed in accordance with various embodiments of the present invention in correspondence to the various figures. The exemplary engine and control systems include a conventional four-cycle internal combustion engine 12 and electronic engine control module (ECM) (not separately illustrated). The exemplary engine comprises a known compression-ignition engine having an operating regime that is primarily lean of stoichiometry. Alternatively, the engine may comprise an engine using any one of a number of engine control strategies which operate lean of stoichiometry, e.g. homogeneous-charge compression-ignition engines, and lean-burn spark-ignition engines. The exemplary engine 12 includes a plurality of reciprocating pistons attached to a crankshaft, which is operably attached to a vehicle driveline to deliver tractive torque to the driveline.

The control system preferably comprises a distributed control module architecture including the ECM. The control system may include a plurality of control modules adapted to provide coordinated control of the various vehicle systems including the powertrain system described herein. The control system is operable to monitor inputs from sensing devices, synthesize pertinent information, and execute algorithms to control various actuators to achieve certain objectives, i.e. fuel economy, emissions, performance, driveability, and protection of hardware. A vehicle operator typically controls or directs operation of the powertrain including the engine such as through an accelerator pedal, a brake pedal, transmission gear selector, and vehicle speed cruise control. Each of the aforementioned controllers and devices communicate with other controllers, devices, sensors, and actuators via a high-speed local area network (LAN) bus (not separately illustrated). The LAN bus allows for structured communication of control parameters and commands between the various processors, control modules, and devices. The specific communication protocol utilized is application-specific. The LAN bus and appropriate protocols provide for robust messaging and multi-controller interfacing between the aforementioned controllers, and other controllers providing functionality such as antilock brakes, traction control, and vehicle stability.

The ECM comprises a central processing unit and volatile and non-volatile memory. The ECM interfaces with sensing devices and actuators to ongoingly monitor and control operation of the engine 12 as shown. The actuators include hardware necessary for proper control and operation of the engine, including, by way of example, an air intake system, a fuel injection system, a spark-ignition system (when a spark-ignition engine is used), an exhaust gas recirculation (EGR) system, and an evaporative control system. Engine sensing devices include devices operable to monitor engine operation, external conditions, and operator demand, and include, for example, accelerator pedal position, mass airflow (MAF) sensor, exhaust gas constituent sensors, manifold absolute pressure (MAP) sensor, crank angle sensor and cylinder pressure sensors. Known cylinder pressure sensors may sense combustion pressure directly, e.g. via intrusive or non-intrusive pressure sensors, or indirectly e.g. via ion sensing or crankshaft torque.

Algorithm code or instruction sets are stored in the non-volatile memory devices, are executed by the central processing unit and are operable to monitor inputs from the sensing devices and execute engine control and diagnostic routines to control operation of the engine, using preset calibrations. Algorithms are typically executed during preset loop cycles, with each control algorithm executed at least once each loop cycle. Loop cycles are typically executed each 3.125, 6.25, 12.5, 25 and 100 milliseconds during engine operation. Alternatively, control algorithms may be executed in response to occurrence of an event. A cyclical event, e.g. calculation of engine fueling, may be executed each engine cycle. A diagnostic algorithm may be executed once per engine key-on cycle. A diagnostic algorithm may have further limitations including requirements for achieving specific enablement criteria before execution. Use of the ECM to control and diagnose operation of various aspects of the internal combustion engine 12 is well known to one skilled in the art.

With reference to FIG. 1, an exemplary EGR control feedback is mass airflow or MAF 13 obtained from a MAF sensor 14. MAF is compared with a MAF target, e.g. from EGR Control Baseline Set-point Map 15. The error is provided to EGR control 11 to adjust EGR valve 8 accordingly to drive the error to zero. A feed-forward part of the control (not separately illustrated) and the EGR Control Baseline Set-point Map 15 are preferably calibrated offline through known dynamometric techniques. The feed-forward control may comprise, for example, tabulated EGR valve positions as stored in calibration tables referenced by engine speed and load data (i.e. fuel command). In accordance with an embodiment, engine 12 is additionally configured with one or more cylinder pressure sensors 16. The control system is structured to adjust the MAF target based on combustion information 18 derived from cylinder pressure sensors 16. EGR correction control 17 uses combustion phasing feedback information 18 (e.g. X % burn rate angle, rate of burning at X degrees crank angle, combustion duration, slope of burn rate) and compares it to a combustion phasing target 19, e.g. from Baseline Combustion Phasing Map 20. This comparison perturbs the nominal MAF target from EGR Control Baseline Set-point Map 15 to drive the error input to EGR Control Set-point Optimizer 21 to zero.

MAF targets and combustion phasing targets are referenced, for example, using engine speed and load data (i.e. fuel command). Additional correction may be afforded in accordance with intake temperature, ambient pressure, fuel type, etc. Baseline Combustion Phasing Map 20 is preferably calibrated offline through known dynamometric techniques. Baseline combustion phasing targets represent desired combustion characteristics relative to a plurality of metrics (e.g. NOx emissions, combustion noise, fuel economy, and maximum MBT at dilution/knock limits for gasoline applications). The closed loop portion of the control maintains the desired combustion characteristics in the presence of variations, disturbances, aging, etc. The EGR Control Set-point Optimizer 21 in one implementation is a slow integrator. In other words, the EGR Control Set-point Optimizer 21 slowly increases or decreases the MAF set-point if the achieved EGR (combustion phasing feedback) 18 is less or more than expected. The additional combustion phasing information on the effect of EGR in combustion makes it possible to realize the online optimization of target value for the closed-loop EGR controller.

Exemplary information 18 may correspond substantially to 50% fuel burned, e.g. crank angle of 50% fuel burned (CA50). Information 18 may correspond, for example, to an average across all cylinders, to a single cylinder, or to a bank of cylinders in accordance with the available engine cylinder pressure sensing hardware configuration and cost considerations. For example, in an EGR valve per bank configuration, the engine may benefit from pressure sensing corresponding to each bank such that the combustion phase information from each bank corresponds to control of the respective EGR valve. Additionally, while the embodiments described herein are with respect to external exhaust gas recirculation apparatus (e.g. EGR valve for effecting exhaust gas recirculation from exhaust manifold to intake manifold), internal exhaust gas recirculation apparatus (i.e. variable valve trains, e.g. fully flexible, variable lift, multi-lobed cams, cam phasers, etc., for effecting exhaust gas trapping and/or exhaust gas reingestion) are all exhaust gas recirculation apparatus as the term is used herein effectively controllable in accordance with the invention described herein.

It may be desirable to maintain similar heat release rates for combustion in each individual cylinder. One way of achieving this is by obtaining combustion information from cylinder pressure sensors at each cylinder and using fuel injection timing (e.g. start of injection (SOI)) in closed-loop to compensate for the differences in the burn rates achieved. However, the same information cannot be used to learn and correct for EGR error unless the individual cylinder combustion phasing control is de-activated for the period when EGR corrections are learned.

Therefore, an alternative to this strategy in accordance with another embodiment is to pre-select a second combustion phasing metric and establish EGR corrections in accordance therewith. As a non-limiting example, combustion duration information may be derived from the difference between first and second points (e.g. CA10 and CA90) and used to learn/modify EGR set-point based on the set-point of this difference. Since the extra EGR slows down the combustion, this duration information provides a secondary feedback signal so that cylinder-to-cylinder SOI phase balancing and EGR set-point optimization can be realized simultaneously. This allows both phasing control and EGR correction to be operational continuously without any required de-activation. Alternative secondary combustion phasing metrics may include, for example; X % burn rate angle, burn rate at X degrees crank angle, slope of burn rate, all at different points in the combustion progression relative to the first combustion phasing metric.

A general block diagram of one such embodiment is depicted in FIG. 2 wherein both individual cylinder phasing control 23 and EGR correction control 17' are shown. In this case, individual cylinder combustion phasing information 18' is compared to a combustion phasing target, e.g. from Baseline Combustion Phasing Map 22. The error is provided to Individual Cylinder Phasing Balancing Controller 25 to adjust SOI accordingly to drive the error to zero. This phasing control utilizes injection timing for each cylinder to make the resulting combustions substantially identical for each cylinder. Burn rate profiles for each cylinder are desirably the same as a reference profile at a current operating point. In implementation, alignment of a single point on individual burn profiles is utilized to effect such phasing alignment. The baseline combustion phasing targets represent desired combustion characteristics relative to a plurality of metrics (e.g. NOx emissions, combustion noise, fuel economy, and maximum MBT at dilution/knock limits for gasoline applications). The closed loop portion of the control maintains the desired combustion characteristics in the presence of variations, disturbances, aging, etc. Baseline Combustion Phasing Map 22 is preferably calibrated offline through known dynamometric techniques.

With continued reference to FIG. 2, Secondary Combustion Phasing feedback information 18", combustion duration in the present example, is fed in to EGR correction control 17' analogous to the previously described EGR correction control 17 substantially as set forth in the description associated with the embodiment of FIG. 1. In this case, Secondary Combustion Phasing feedback (e.g. combustion duration) 18" is compared to a Secondary Combustion Phasing target (e.g. baseline combustion duration target) 19', e.g. from Baseline Secondary Combustion Phasing Map 20'. This comparison perturbs the nominal MAF target from EGR Control Baseline Set-point Map 15 to drive the error input to EGR Control Set-point Optimizer 21' to zero. Baseline Secondary Combustion Phasing Map 20' is preferably calibrated offline through known dynamometric techniques. The combustion duration targets represent desired combustion characteristics relative to a plurality of metrics (e.g. NOx emissions, combustion noise, fuel economy, and maximum MBT at dilution/knock limits for gasoline applications). The closed loop portion of the control maintains the desired combustion characteristics in the presence of variations, disturbances, aging, etc.

In accordance with yet another embodiment, an alternative method of simultaneous EGR control and individual cylinder phase balancing is based on only a single combustion phasing feedback metric. A block diagram of this method is depicted in FIG. 3. Therein, individual cylinder phasing control is performed as described with respect to the embodiment of FIG. 2 wherein individual cylinder combustion phasing information 18' is compared to a combustion phasing target, e.g. from Baseline Combustion Phasing Map 22. The error is provided to Individual Cylinder Phasing Balancing Controller 25 to adjust SOI accordingly to drive the error to zero. This phasing control utilizes injection timing for each cylinder to make the resulting combustions substantially identical for each cylinder. Burn rate profiles for each cylinder are desirably the same as a reference profile at a current operating point. In implementation, alignment of a single point on individual burn profiles is utilized to effect such phasing alignment. The baseline combustion phasing targets represent desired combustion characteristics relative to a plurality of metrics (e.g. NOx emissions, combustion noise, fuel economy, and maximum MBT at dilution/knock limits for gasoline applications). The closed loop portion of the control maintains the desired combustion characteristics in the presence of variations, disturbances, aging, etc. Baseline Combustion Phasing Map 22 is preferably calibrated offline through known dynamometric techniques.

In the present embodiment of FIG. 3, however, with respect to EGR control, SOI adjustments are fed in to EGR correction/learning control 17" and an average SOI correction across all cylinders is determined. This average SOI adjustment is compared to a mean engine SOI target 19". This comparison perturbs the nominal MAF target from EGR Control Baseline Set-point Map 15 to drive the error input to EGR Control Set-point Optimizer 21" to zero. Ideally, the mean engine SOI target is zero; however, this assumes that SOI correction is due solely to mixture. Other factors, for example a top dead center offset of the crank angle signal relative to true top dead center, may in fact account for error apart from the mixture. In such a case, during very low levels of EGR, non-zero SOI corrections may be attributed to a TDC offset. This offset can be used to adapt the control such that the SOI correction target is a non-zero value and the SOI correction addresses only the mixture related component as described further herein below. While the present embodiment is described with respect to average SOI corrections across all cylinders, alternative implementations include use of average SOI corrections across a subset of cylinders (e.g. each bank of cylinders associated with independent EGR valves) or SOI corrections of a single cylinder. And, apart from averages of SOI corrections, other mathematical, statistical, or filtered representation may be utilized including, for example, minimum and maximum correction values.

If there is a mixture error in the engine, it is expected that the engine average of each SOI correction will be biased to a value that indicates whether the mixture is richer or leaner compared to the baseline mixture. For example, if the average SOI correction for the engine is in the advanced direction, a richer mixture compared to nominal for the engine is indicated. The EGR correction/learning control 17" uses the engine average SOI correction as the feedback signal and adjusts the target MAF to drive the engine average SOI correction to zero or another target value. With this structure, both the cylinder phasing and EGR controllers can continuously be active at the same time; however, the EGR correction and the corresponding SOI correction response take place in a slower time scale which can deliberately be realized by both filtering the EGR correction control feedback signal and choosing much smaller gains for the EGR correction control. EGR correction control is a slow learning controller for the closed EGR controller target.

An implicit assumption for the EGR correction control whether it uses the combustion phasing information directly (e.g. FIG. 1) or the outputs of individual phasing controllers (e.g. FIG. 3) is that the phasing error is only caused by the mixture errors. However, different factors may create a compounded error in the phasing metric. If mixture error is not the dominant error source, correcting the phasing metric through EGR adjustments alone may not provide the ideal correction. Therefore, the deliberate mechanization of slow EGR correction may be useful to separate errors caused by EGR and other sources. For example, based on a specific calibration of the exemplary diesel engine, very small amounts of EGR are used in conventional combustion modes. If it is observed that small variations in EGR do not have significant effect on the phasing metric, it may be reasonably concluded that the resulting mean engine SOI correction at a conventional point is considered to be associated only with non-EGR related sources. For global errors effective over the complete speed-load range such as TDC offset, the original mean SOI correction feedback can be biased based on the baseline correction required at a conventional point, in order to generate a net feedback error signal solely indicative of the EGR dispersion for the slow EGR correction controller.

Although MAF target has been given as an example EGR control target in the previous embodiments, it is understood that the EGR rate correction can be applied on any chosen EGR control parameters or variables. Such other references may include, for example, intake oxygen fraction and EGR rate. In other words, if the EGR control is achieved using targets on other sensors or estimators, corrections can be applied on those variables instead of MAF without departing from the scope of the invention.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for simultaneous exhaust gas recirculation and individual cylinder combustion phasing control in a multi-cylinder internal combustion engine configured with fuel delivery apparatus, cylinder pressure sensing apparatus and exhaust gas recirculation apparatus, comprising:
   providing combustion phasing information from said cylinder pressure sensing apparatus;
   closed-loop adjusting said fuel delivery apparatus in accordance with predetermined setpoints and feedback in said combustion phasing information;
   closed-loop controlling said exhaust gas recirculation apparatus in accordance with predetermined setpoints and feedback in a preselected exhaust gas recirculation control parameter;
   comparing adjustments to said fuel delivery apparatus to predetermined adjustment targets; and,
   adjusting the predetermined setpoints in the preselected exhaust gas recirculation control parameter based on the comparison of the adjustments to said fuel delivery apparatus to predetermined adjustment targets.

2. The method as claimed in claim 1 wherein said combustion phasing information comprises at least one of an engine crank angle at a predetermined burn rate, a burn rate at a predetermined crank angle, a combustion duration and a slope of a burn rate.

3. The method as claimed in claim 1 wherein said preselected exhaust gas recirculation control parameter comprises one of a mass airflow, an EGR rate and an intake oxygen fraction.

4. The method as claimed in claim 1 wherein said exhaust gas recirculation apparatus comprises an EGR valve.

5. The method as claimed in claim 1 wherein said exhaust gas recirculation apparatus comprises a variable valvetrain.

6. The method as claimed in claim 1 wherein comparing adjustments to said fuel delivery apparatus to a predetermined adjustment target comprises comparing average adjustments across all cylinders to said fuel delivery apparatus to predetermined mean adjustments.

7. The method as claimed in claim 1 wherein providing combustion phasing information from said cylinder pressure sensing apparatus comprises providing individual cylinder combustion phasing information.

8. Control apparatus for an internal combustion engine having a plurality of combustion chambers and fuel delivery apparatus, comprising:
   a combustion chamber pressure sensing apparatus for providing combustion chamber phasing information;
   exhaust gas recirculation apparatus; and
   a control module adapted for adjusting said fuel delivery apparatus to effect a predetermined first target in said combustion phasing information, and for controlling said exhaust gas recirculation apparatus to effect a predetermined second target in a preselected engine parameter, and adjusting the predetermined second target based on a comparison of an average adjustment across all cylinders to said fuel delivery apparatus to a predetermined mean adjustment.

9. The control apparatus as claimed in claim 8 wherein said combustion chamber phasing information comprises at least one of an engine crank angle at a predetermined burn rate, a burn rate at a predetermined crank angle, a combustion duration and a slope of a burn rate.

10. The control apparatus as claimed in claim 8 wherein said preselected engine parameter comprises on of mass airflow, EGR rate and intake oxygen fraction.

11. The control apparatus as claimed in claim 8 wherein said exhaust gas recirculation apparatus comprises an EGR valve.

12. The control apparatus as claimed in claim 8 wherein said internal combustion engine comprises two banks of cylinders and said exhaust gas recirculation apparatus comprises one EGR valve per bank of cylinders.

13. The control apparatus as claimed in claim 8 wherein said exhaust gas recirculation apparatus comprises a variable valvetrain.

14. Controller for an internal combustion engine having a plurality of combustion chambers, comprising:
   an EGR control responsive to a first control setpoint effective to control an EGR apparatus setting;
   a fuel delivery control operative to monitor combustion chamber phasing and adjust a fuel delivery apparatus to effect a combustion phasing setpoint; and
   an EGR trim control operative to monitor an average adjustment across all combustion chambers to said fuel delivery apparatus and adjust said first control setpoint to effect a second control setpoint for said average adjustment across all combustion chambers to said fuel delivery apparatus.

15. The controller as claimed in claim 14 wherein said combustion chamber phasing comprises at least one of an engine crank angle at a predetermined burn rate, a burn rate at a predetermined crank angle, a combustion duration and a slope of a burn rate.

16. The controller as claimed in claim 14 wherein said EGR control comprises a control feedback in a predetermined control parameter.

17. The controller as claimed in claim 16 wherein said control parameter comprises one of mass airflow, EGR rate and intake oxygen fraction.

18. The controller as claimed in claim 14 wherein said exhaust gas recirculation apparatus comprises an EGR valve.

19. The controller as claimed in claim 14 wherein said exhaust gas recirculation apparatus comprises a variable valvetrain.

* * * * *